Nov. 14, 1967  C. J. ALEXANDER ET AL  3,352,011
ELECTRICALLY HEATED FLEXIBLE KNIFE
Filed April 22, 1966  2 Sheets-Sheet 1
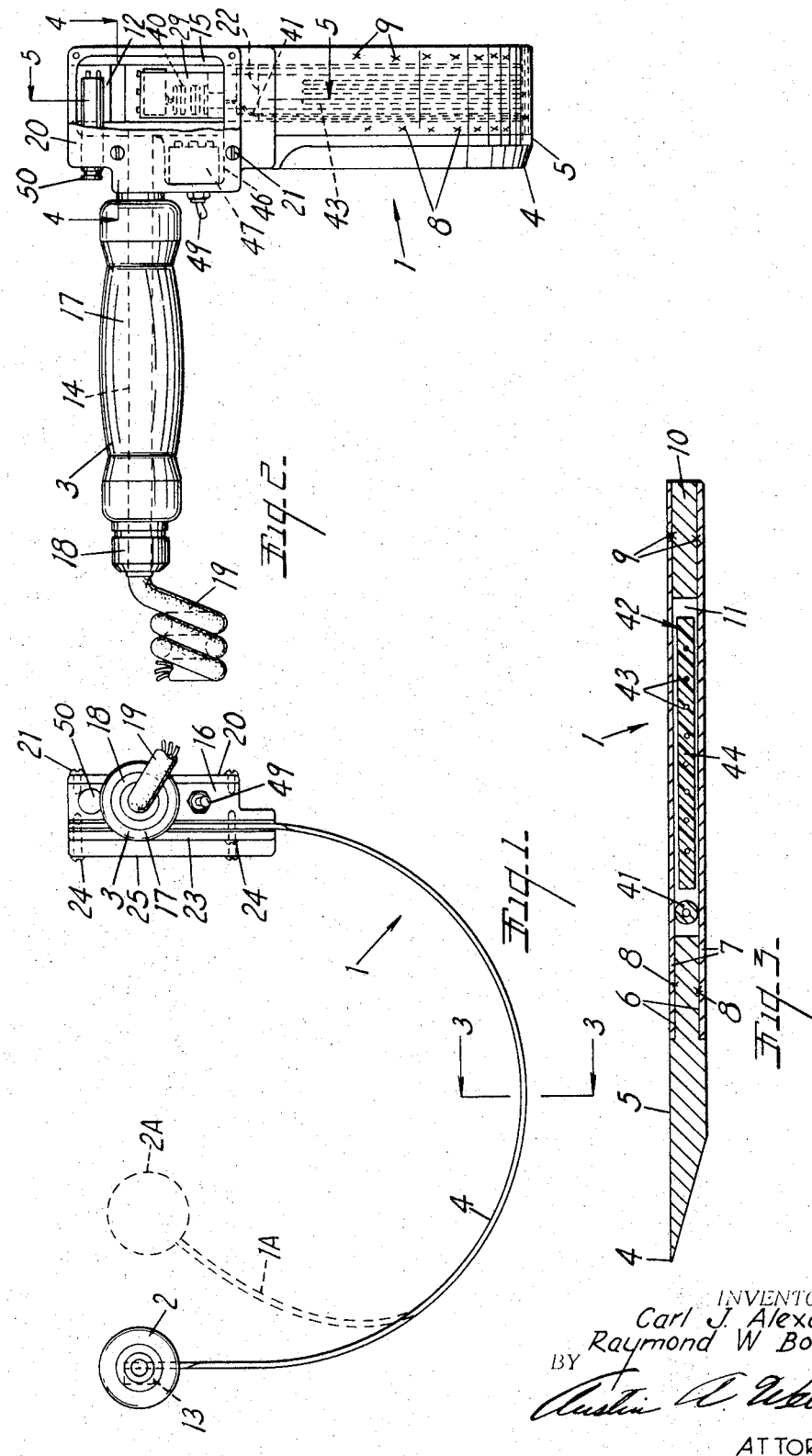
INVENTOR.
Carl J. Alexander
Raymond W. Bowers
BY
ATTORNEY.

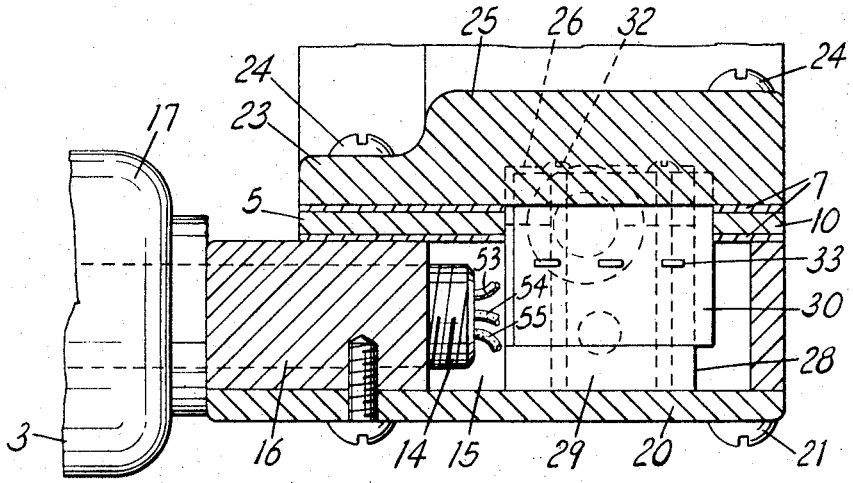
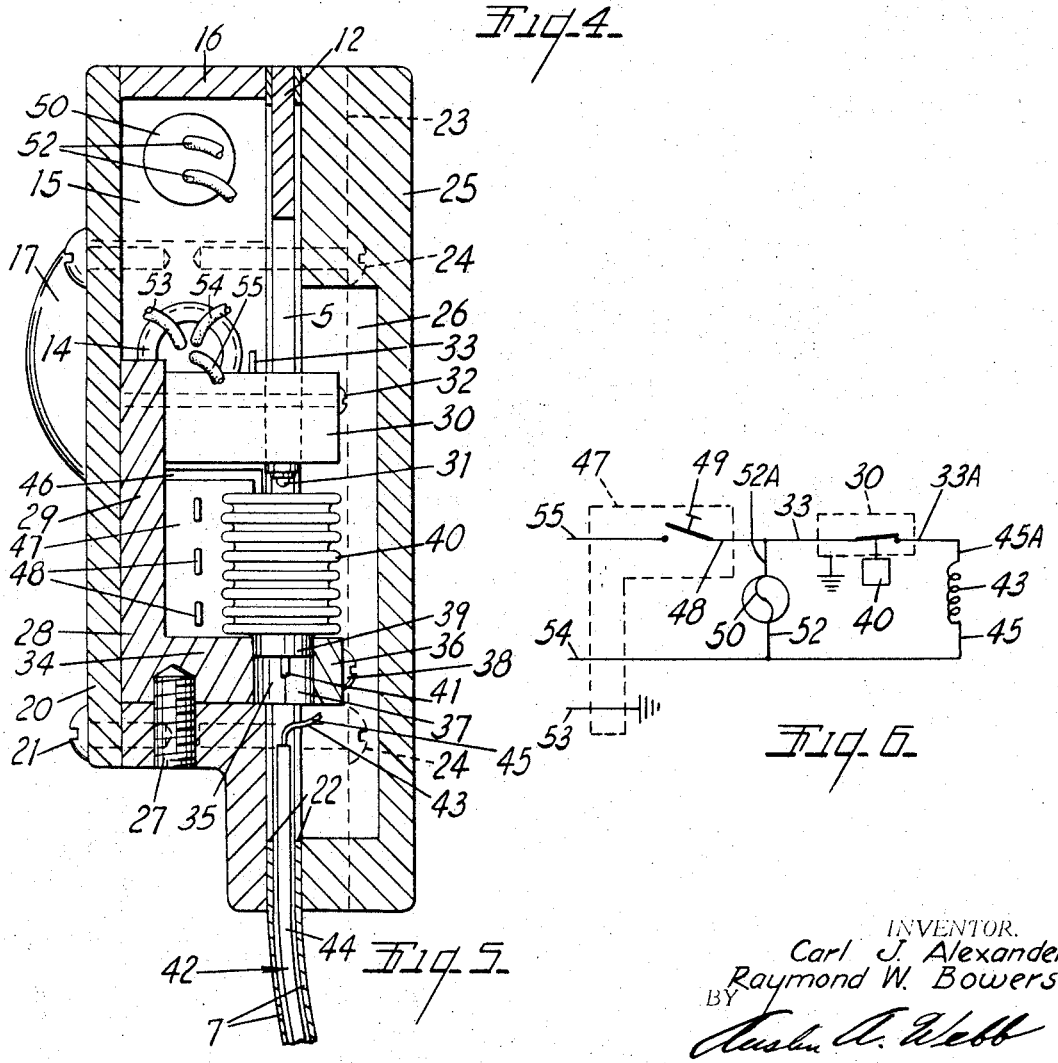

United States Patent Office 3,352,011
Patented Nov. 14, 1967

3,352,011
ELECTRICALLY HEATED FLEXIBLE KNIFE
Carl J. Alexander, Moorepark, and Raymond W. Bowers, Three Rivers, Mich., assignors to Wells Manufacturing Corporation, Three Rivers, Mich.
Filed Apr. 22, 1966, Ser. No. 544,601
10 Claims. (Cl. 30—140)

ABSTRACT OF THE DISCLOSURE

Flexible draw knife with handles at each end and variable U-shaped curve, for cutting pork loins; a flexible electric heating element enclosed within the blade; and an elongated, temperature integrating, heat sensing element extending from a thermostatic control in one handle along the length of the heating element, within the blade.

This invention relates to an electrically heated flexible knife.

Objects of the invention are:

First, to provide a knife that has a permanent cutting edge and an enclosed electric heating element with electrical connections through the handle of the blade, in which the blade and heating element can be flexed transverse to the cutting edge, and in which the heating element is completely sealed to permit external sterilization of the knife and handle.

Second, to provide a flexible and electrically heated knife with a thermostatic control connected to keep the cutting edge and blade of the knife at a preselected temperature.

Third, to provide a novel temperature sensing element which can be located within a long thin space to integrate and be responsive to temperatures at different points along an elongated cutting edge to actuate a switch located in a portion of the handle of the knife.

Fourth, to provide an electrically heated and flexible bladed knife which is particularly adapted for use in the animal slaughtering and meat cutting industry.

Other objects and advantages of the invention will be apparent from a consideration of the following description and claims. The drawings, of which there are two sheets, show a highly practical form of the knife of the invention.

FIGURE 1 is a front elevational view of one possible form of the knife.

FIGURE 2 is a projected side elevational view of the knife in FIGURE 1, with parts broken away.

FIGURE 3 is an enlarged cross sectional view through the blade of the knife, taken along the plane of the line 3—3 in FIGURE 1.

FIGURE 4 is an enlarged, fragmentary, cross sectional view through the handle and control of the knife, taken along the plane of the line 4—4 in FIGURE 2.

FIGURE 5 is an enlarged fragmentary cross sectional view taken along the plane of the line 5—5 in FIGURE 2.

FIGURE 6 is a schematic wiring diagram of the heating element and control of the knife.

The particular form of the knife illustrated is known as a universal loin cutting knife and is used in the meat cutting and packing trade to remove the loin portion from chilled hog sides. It will be understood that the invention is applicable to other knives such as right, and left, loin cutting knives, skinning knives, ribbing knives, and other knives used in the meat cutting industry. It is also applicable to knives used in other relations where a flexible, heated blade, with one or two handles is useful.

The knife consists of a curved blade indicated generally at 1 and having handles 2 and 3 connected transversely to the ends of the blade to project forwardly of the cutting edge 4 of the knife. The knife is used by drawing it forwardly through a chilled hog side to separate the loin from the remainder of the side. As indicated by the dotted lines at 1A and 2A, the blade is flexible by pressing the handles together to conform more closely to various sizes of loins.

The blade 1 is formed of a leading strip 5 on which the cutting edge 4 is ground. The rear edge of the strip is notched or rabbeted on both sides as at 6. Thin side plates 7 are welded in the notches as indicated at 8 to form continuous sealed joints. The rear edges of the side plates are welded as at 9 to opposite sides of a filler strip 10 to define a cavity 11 that is relatively wide, across the width of the blade, but thin across the thickness of the blade. The composite blade is no thicker than solid blades currently used for the same purpose. The ends of the cavity are closed by filler plugs, one of which appears at 12 in FIGURES 2 and 5 welded between the leading strip and the filler strip and the side plates 7.

The handle 2 has a metal base 13 bolted or otherwise secured to one end of the blade. The handle 3 at the other end of the blade is formed of an inner pipe 14 threaded into a recess 15 formed in a body 16. A wood or other grip 17 is positioned around the pipe and held in place by a clamp nut 18, that also forms a packed, watertight joint between the end of the pipe and a three conductor electrical cable 19. A flat plate 20 secured to the outer side of the handle body by the screws 21 closes the outer side of the recess 15. It will be noted from FIGURES 2 and 5 that the ends of the side plates 7 are notched as at 22 alongside of the body 16 to form part of the recess 15. An inner cover 23 is secured to the inner side of the curved blade by screws 24 passing through the blade to the body 16. This secures the body and the handle to the blade and also closes off the inner side of the recess 15. The inner cover is thickened at the back at 25 and internally recessed at 26 thus forming an enlargement of the recess 15.

Secured to the bottom of the recess 15 in the body by a screw 27 is an L-shaped mounting bracket 28 (see FIGURE 5). The upright 29 of the bracket fits against the outer cover and supports a normally closed switch 30 having an operating button or plunger 31. Screws 32 secure the switch housing to the upright 29. Connecting terminals 33 project from the top of the switch housing.

The lower horizontal leg 34 of the bracket 28 defines a semicylindrical notch 35 that projects over the notched or cut-away ends 22 of the blade side plates and the exposed end of the cavity 11 in the blade. A clamp block 36 with a mating semicylindrical notch 37 is secured to the end of the leg 34 by screws 38 and the mating notches serve to clamp the lower cylindrical end 39 of an expansible bellows 40 to the mounting bracket. The upper end of the bellows is opposed to the switch operating plunger 31 and functions to open the switch when the bellows expands. Sealed to the bottom of the bellows and communicating with the interior thereof is a small heat sensing tube 41. The tube extends downwardly (see FIGURE 2) into the cavity 11 in the blade and around a substantial portion of the curved length of the blade. The tube and the bellows are filled with a liquid that expands when heated. Preferably the liquid has little expansion from room temperature to around 180 degrees F. but expands rapidly above that temperature. N-propyl alcohol is an example of such a liquid.

Positioned in the blade cavity 11 in closely fitting but unconnected relation to the wall of the cavity, behind the sensing tube 41, is a thin flexible resistance heating element indicated generally at 42. A fine resistance wire 43 arranged in zig-zag turns in a flexible insulating body 44 extends substantially completely along the cavity 11 behind the sharpened cutting edge 4. Since the temperature of the blade is limited, as will be explained, various known flexible materials are satisfactory insulators. The ends 45 of the heating coil extend from the heating element into the recess 15, 26 for connection as will be described.

The main recess 15 in the body 16 has a lower extension 46 that projects forwardly and receives the housing of an on-off switch 47 having connecting terminals 48. A control handle 49 projects forwardly through the front of the body below the knife grip 17. An indicator lamp 50 projects through the upper end of the body above the grip and has lead wires 52 projecting into the recess. No attempt has been made to show the physical connections of the wires in the recess 15, 26 as that is shown in the wiring diagram of FIGURE 6. The three conductors 53, 54 and 55 of the cable 19 extend as described into the recess. Conductor 53 is a safety ground wire which is grounded to the body and blade of the knife at a convenient point (not illustrated). Another conductor 54 connects to one of the lead wires 52 of the lamp and one end 45 of the resistance heating element. The other lead 52A of the lamp connects to a terminal 48 of the switch 47 and to a terminal 33 of the switch 30. The opposite terminal 33A of switch 30 is connectable by the switch to the other end 45A of the heating element.

*Operation*

When the cable 19 is connected to a source and switch 47 is closed by manual control 49, the lamp 50 is lighted. Switch 30 being normally closed, the heating element 43 is energized and starts to heat the blade 5. When blade 5 reaches the desired temperature, as indicated by heating and expansion of the fluid in the sensing tube 41, the bellows 40 expands to actuate the control button 31 of switch 30 and open the circuit to the heating coil 43.

For meat cutting purposes, the characteristics of the circuit and the control are selected to keep the blade at about the temperature of boiling water, 212 degrees. At this temperature the knife cuts smoothly through hog fat without heating the fat to a temperature that would scorch the fat and cause it to adhere to the knife. A heating element of about 200 watts capacity has been found to be sufficient for steady and repeated use of the knife at the rate such knives are used at the present time in meat cutting work. For cutting at different rates, or for cutting different materials, the characteristics can of course be changed. One method of change is to vary the position of the bellows 40 in the holding socket 35 so that the switch operator 31 is engaged and actuated at a different temperature as indicated by temperature and pressure in the sensing tube 41.

What is claimed as new is:

1. A heated knife comprising a blade having a sharpened edge,
   a pair of side plates secured in sealed relation along opposite sides of the rear edge of said blade and projecting therebehind,
   means sealing the rear edges of said side plates to define a cavity along the rear of said blade, the assembled blade, side plates and sealing means being flexible transversely of their sides to curve the sharpened edge of the blade,
   an elongated thin electric heating element having flexible insulation covering the electrically conducting elements thereof positioned in said cavity and extending therealong in unconnected relation to the surfaces of said cavity,
   a housing secured to one end of said blade and said side plates and sealing said cavity,
   an electrical connection extending in sealed relation through a wall of said housing and electrically connected to said heating element,
   and a handle connected to the end of said blade and said side plates by being connected to said housing.

2. A knife as defined in claim 1 in which there is a switch mounted in said housing and electrically connected between said electrical connection and said heating element,
   an expansible element mounted in said housing and positioned to actuate said switch,
   and a temperature sensing element extending along said cavity between one edge of said heating element and the adjacent edge of said cavity and connected to said expansible element to activate the latter in response to temperature change of said blade.

3. A knife as defined in claim 2 in which said sensing element is a tube and said tube and said expansible element being filled with a heat expansible fluid.

4. A knife as defined in claim 3 in which said fluid has its greatest rate of expansion above 180 degrees F.

5. A knife as defined in claim 1 in which said means sealing the back of said side plates is a filler strip sealed between the side plates,
   a body plate secured to the flat side of the end of said blade having a recess formed therein communicating with said cavity and forming part of said housing, and
   a removable cover plate secured to said body plate and providing access to said housing.

6. A knife as defined in claim 5 in which said handle includes a pipe extending through said body plate into said housing, and in which said electrical connection extends through said pipe and is sealed at the outer end of said handle.

7. A knife as defined in claim 5 in which said blade, said side plates and said filler strip are curved arcuately,
   said handle being connected to said blade in forwardly extending relation to the plane of curvature of the blade, and
   a second handle connected to the other end of said blade.

8. A knife as defined in claim 7 in which there is a second removable cover plate secured to the opposite side of said body plate and defining an opposite side of said recess,
   an L-shaped bracket secured to the bottom of said recess in said body plate and having an upstanding leg,
   an electrical switch secured to said upstanding leg and having a downwardly facing actuating element,
   said switch being electrically connected between said electrical connection and said heating element,
   an expansible element secured to the lower leg of said L-shaped bracket by a clamp member accessible through said second cover member,
   said expansible element being positioned to move said actuating element when expanded, and
   a tubular temperature sensing element connected to and communicating with said expansible element and extending into and along said cavity in said knife.

9. A knife as defined in claim 8 in which said expansible element and said sensing element are filled with a fluid having a relatively low coefficient of expansion below 180 degrees F. and a relatively high coefficient of expansion above that temperature.

10. A knife as defined in claim 2 in which said expansible element and said sensing element are arranged to limit the temperature of said blade to not materially greater than 212° F. that will char meat.

References Cited

UNITED STATES PATENTS

| 2,574,440 | 11/1951 | Smith et al. | 30—140 |
| 2,863,036 | 12/1958 | Mitchell et al. | 30—140 |
| 2,908,793 | 10/1959 | Aloi | 219—241 |
| 2,960,592 | 11/1960 | Pierce | 30—140 |
| 3,208,142 | 9/1965 | Osrow | 30—140 |

WILLIAM FELDMAN, *Primary Examiner.*

G. WEIDENFELD, *Assistant Examiner.*